(12) United States Patent
Jones et al.

(10) Patent No.: US 8,267,210 B2
(45) Date of Patent: Sep. 18, 2012

(54) POWER SUPPLY ASSEMBLY FOR MOTORIZED VEHICLES

(75) Inventors: Colburn L. Jones, Dallas, PA (US); James M. Kosco, West Wyoming, PA (US); Mark A. Goodell, Thornhurst, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 676 days.

(21) Appl. No.: 12/207,099

(22) Filed: Sep. 9, 2008

(65) Prior Publication Data

US 2009/0000835 A1 Jan. 1, 2009

Related U.S. Application Data

(66) Continuation-in-part of application No. 10/960,800, filed on Oct. 7, 2004, now Pat. No. 7,431,109, Substitute for application No. 60/509,491, filed on Oct. 8, 2003.

(51) Int. Cl.
*B60K 1/04* (2006.01)
(52) U.S. Cl. ...................... 180/68.5; 180/907
(58) Field of Classification Search .................. 180/65.1, 180/68.5, 908, 907; 429/99, 121
See application file for complete search history.

(56) References Cited

U.S. PATENT DOCUMENTS

| | | | |
|---|---|---|---|
| 2,588,870 A * | 3/1952 | Pittman | 180/68.5 |
| 2,978,053 A | 4/1961 | Schmidt | |
| 3,437,164 A | 4/1969 | Rabjohn | |
| 3,708,028 A | 1/1973 | Hafer | |
| 3,877,764 A * | 4/1975 | Hillier, Jr. | 312/107 |
| 3,930,552 A | 1/1976 | Kunkle et al. | |
| 4,216,839 A | 8/1980 | Gould et al. | |
| 4,317,497 A | 3/1982 | Alt et al. | |
| 4,570,739 A | 2/1986 | Kramer | |
| 4,944,359 A | 7/1990 | Doman et al. | |
| 4,960,287 A | 10/1990 | Lautzenhiser et al. | |
| 4,967,864 A | 11/1990 | Boyer et al. | |
| 5,042,607 A | 8/1991 | Falkenson et al. | |
| 5,092,774 A | 3/1992 | Milan | |
| 5,125,849 A | 6/1992 | Briggs et al. | |

(Continued)

FOREIGN PATENT DOCUMENTS

DE 2003 700 U1 9/1970

(Continued)

OTHER PUBLICATIONS

UK Examination Report; Application GB 0915761.1; dated Feb. 27, 2012.

*Primary Examiner* — Frank Vanaman
(74) *Attorney, Agent, or Firm* — Flaster/Greenberg P.C.

(57) ABSTRACT

A vehicle having a plurality of wheels and elements, to drive at least one wheel to propel the vehicle is provided with a frame and a power supply assembly for delivering power to the drive elements. The power supply assembly includes a battery and a housing structure surrounding the battery. The power supply assembly is removeably supported on the vehicle frame. A latching mechanism is provided having a pivoting actuator. The actuator moves between a locking position and a release position. The actuator movement displacing a pin disposed in combination with the housing between a locking position, wherein the pin fixedly engages the power supply assembly to the frame, and a release position, wherein the pin disengages and permits the power supply assembly to be removed from the frame.

27 Claims, 12 Drawing Sheets

U.S. PATENT DOCUMENTS

| | | |
|---|---|---|
| 5,150,762 A | 9/1992 | Stegeman et al. |
| 5,151,855 A | 9/1992 | Gray et al. |
| 5,156,226 A | 10/1992 | Boyer et al. |
| 5,197,559 A | 3/1993 | Garin, III et al. |
| 5,291,959 A | 3/1994 | Malblanc |
| 5,351,774 A | 10/1994 | Okamoto et al. |
| 5,522,734 A | 6/1996 | Goertzen |
| 5,525,000 A * | 6/1996 | Belobraydich et al. ....... 403/102 |
| 5,937,623 A * | 8/1999 | Wolf ............................. 56/11.9 |
| 6,095,270 A | 8/2000 | Ishikawa |
| 6,170,592 B1 | 1/2001 | Wu |
| 6,564,893 B2 | 5/2003 | Lipman |
| 6,747,437 B2 | 6/2004 | Chiu |
| 2006/0087279 A1 | 4/2006 | Chen |

FOREIGN PATENT DOCUMENTS

| | | |
|---|---|---|
| DE | 25 58 456 | 6/1977 |
| DE | 200 03 700 U1 | 6/2000 |
| EP | 0 677 413 | 10/1995 |
| EP | 0 844 169 A | 5/1998 |
| EP | 1 569 967 A | 5/1998 |
| EP | 1 547 852 A3 | 8/2006 |
| GB | 2 183 081 | 5/1987 |
| GB | 2 430 182 A | 3/2007 |
| JP | 2000-123806 | 4/2000 |
| WO | 92/04200 | 3/1992 |

* cited by examiner

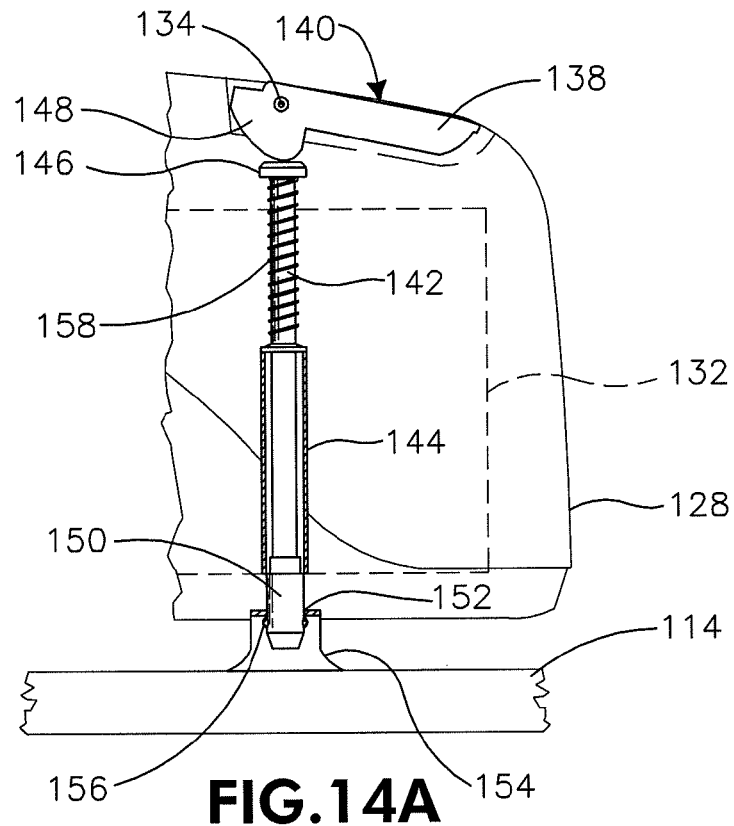
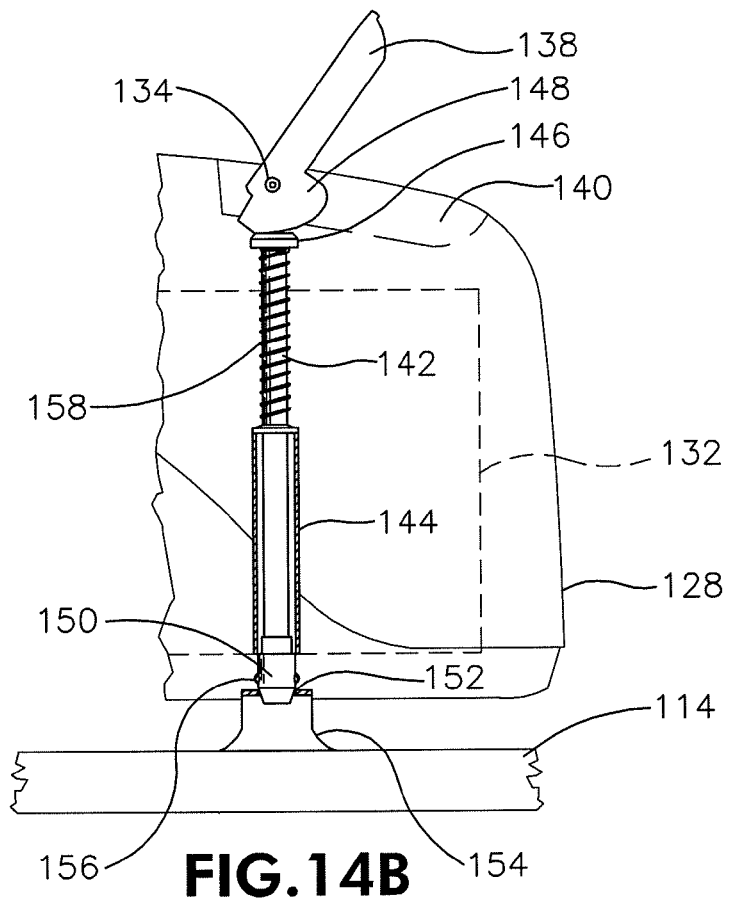

POWER SUPPLY ASSEMBLY FOR MOTORIZED VEHICLES

RELATED APPLICATIONS

This present application is a continuation in part of copending U.S. patent application Ser. No. 10/960,800, filed Oct. 7, 2004, which claims priority from U.S. Provisional Patent Application No. 60/509,491, filed Oct. 8, 2003.

TECHNICAL FIELD

The present application relates to a Power Supply Assembly (PSA) for a Personalized Motorized Vehicle (PMV) and, more particularly, to a detachable mounting assembly which facilitates attachment of a Power Supply Unit (PSU) to a PMV.

BACKGROUND

PMVs have become increasingly popular due, in great part, to the societal changes effected by the Americans with Disabilities Act (ADA) of June 1990. The ADA has, inter alia, resulted in equal access and freedom of movement/mobility for disabled individuals. Notably, various structural changes have been mandated to the construction of homes, sidewalks and even parkway/river crossings, e.g., bridges, to enlarge entrances and provide ramped surfaces to ease mobility for disabled persons in and around society.

Furthermore, electrically powered PMVs offer an environmentally friendly alternative to gasoline burning vehicles such as gas-powered scooters, mopeds, motorcycles, etc. In addition, various technologies have made the mass production of such PMVs fiscally rewarding to manufacturers and affordable for the consumer. For example, the development of long-life rechargeable power supply units, e.g., lithium batteries, fuel cells, etc., has made PMVs practical for everyday use.

While significant advances have been made, there are still many design challenges/limitations, which require innovation and improvement. One such area relates to the transportability of PMVs within other vehicles for use at other destinations. Generally, the size and weight of a PMV presents challenges, even for individuals of considerable strength and dexterity, to lift the PMV into an automobile or disassemble the PMV into manageable subassemblies. Some of the heavier subassemblies to manipulate include the power supply units, e.g., rechargeable batteries, which, individually, can weight in excess of twenty (20) pounds.

Conventionally, each battery is mounted to a floor pan of the PMV by means of a pair of long threaded rods disposed on opposite sides of a battery for clamping the battery to the floor pan. Each rod has an L-bracket at one end for engaging an upper surface of the power supply unit and a J-hook at the other end engaging a mounting aperture of the floor pan. Further, each L-bracket includes an aperture for engaging and sliding longitudinally along the rod. The rod is urged against the battery by a conventional wing nut. Consequently, to remove the battery, the wing nuts are loosened to disengage the L-brackets and the rods are displaced sufficiently to enable the battery to clear the brackets. Generally, each battery will include a strap extending across its top to facilitate handling of the batten. While this assembly provides a positive mounting arrangement for attaching the battery to the floor pan of the PMV (such positive mounting being especially critical for batteries subject to motion or vibration), this mounting arrangement does not facilitate rapid removal and reassembly.

Other mounting arrangements designed with such assembly/disassembly attributes, typically include a hook & rail assembly or a channel & track arrangement disposed along the upper side surfaces of a power supply unit. A typical hook & rail assembly may include, for example, J-shaped hooks disposed in combination with a battery/battery box for being hung on a pair of parallel rails attached to and supported by the PMV frame. As such, the battery/battery box may be installed vertically and relies upon its own weight to prevent the hooks from disengaging the rails. While this mounting arrangement facilitates ease of installation or disassembly, it does not positively retain the battery/battery box.

With respect to channel and track mounting arrangements, channels are formed in combination with the battery/battery box and engage tracks attached to the PMV frame. Installation and disassembly of the battery/battery box requires that the channels slideably engage the track by insertion of the channels through an open end of the track. As such the battery/battery box does not "drop in" vertically (possible with the hook & rail assembly discussed supra), but slides in horizontally. While the channels and track can be configured to positively engage and retain the battery/battery box, the mounting arrangement requires that space be provided for the battery/battery box to slide in a horizontal plane for engaging the track.

In addition to the structural and/or functional disadvantages of the prior art, the battery/battery box and/or mounting assemblies may produce an aesthetically unattractive external appearance. Consequently, such components and assemblies are typically occluded or hidden from sight by a more aesthetically pleasing chassis element or PMV component. For example, a contoured external fuselage or a seat/seat support assembly may be disposed over the battery/battery box to preclude viewing of the battery/battery box and/or mounting arrangement. Consequently, these elements or assemblies must be additionally removed to access and disassemble the battery/battery box.

SUMMARY

A power supply assembly is provided for a vehicle including a detachable mounting for the power supply to a main structural frame of the vehicle. The mounting preferably provides a positive electrical and structural connection between the power supply and the frame and further integrates the assembly with the external geometry of the vehicle to provide an aesthetically pleasing external profile.

The power supply assembly includes a battery and a housing structure that surrounds the battery. The assembly is removeably supported on the vehicle frame. A latching assembly is provided for selectively engaging the power supply assembly to the vehicle frame. The latching mechanism includes an actuator, which may be in the form of a handle that is pivotably supported on the housing and pivotably moves between a locking position and a release position. In addition, a pin is provided in combination with the housing and is operatively connected to the actuator. The pin moves into and out of engagement with the frame between a locking position, wherein the pin fixedly engages the housing to the frame, and a release position, wherein the pin disengages and permits the power supply assembly to be removed from the frame. Preferably, the handle is geometrically blended within the housing structure in the locking position, such as in a recess formed within the housing body. Further, the housing structure is provided with means for electrically engaging a second housing structure to electrically connect the batteries retained in the housing structures. Further, an electrical connection between the power supply assembly and the vehicle may also be provided when the housing is secured to the vehicle frame.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

FIG. 3b is a cross sectional view of an assembled electrical connector of the type shown in FIG. 3a.

FIGS. 14A and 14B are partial cross sectional views of the battery housing, as generally taken substantially along line 14-14, showing the locking position and the release position of the latching assembly.

DETAILED DESCRIPTION

Figure 1:
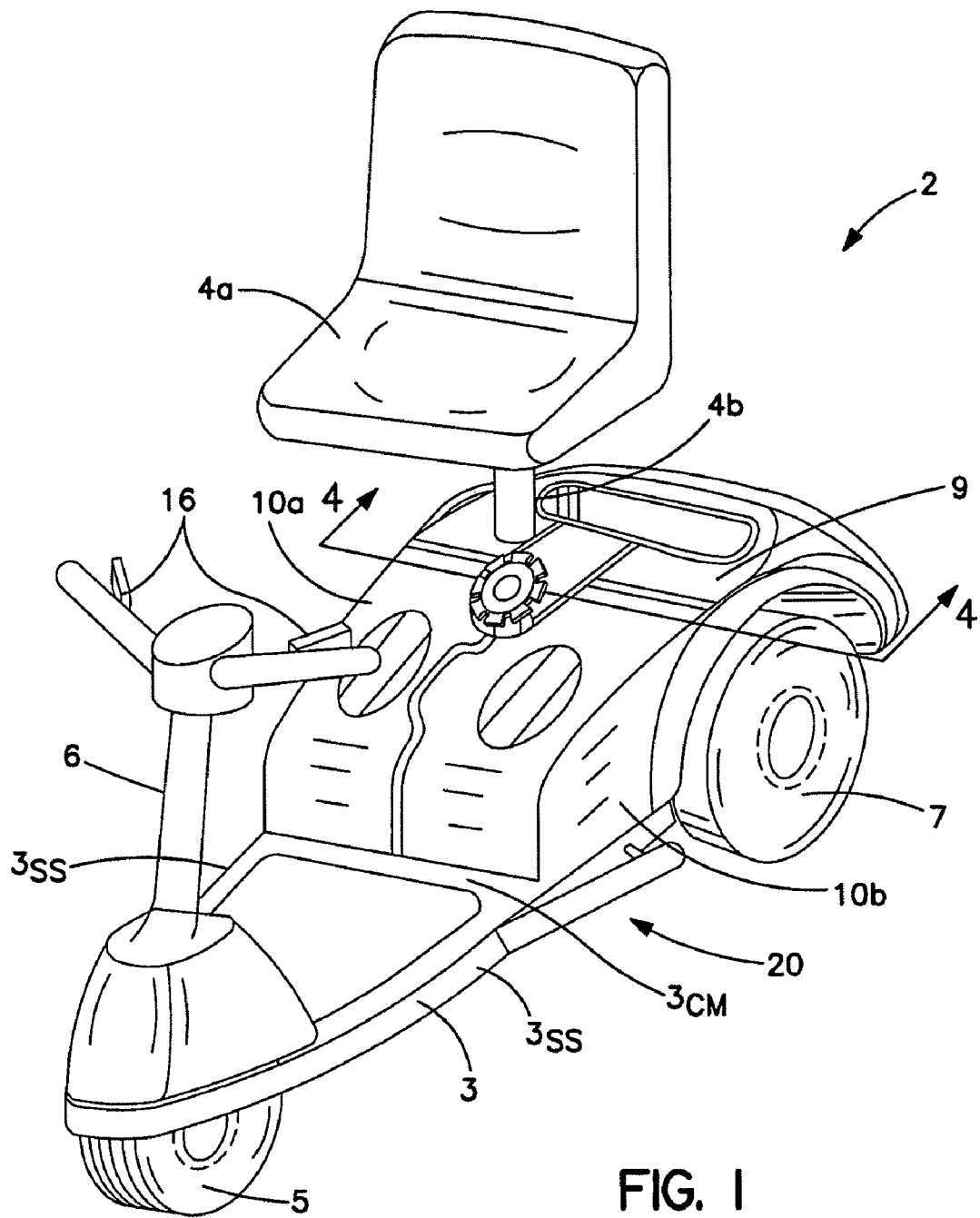
FIG. 1 is a perspective view of a PMV having a PSA thereon.

Referring now to the drawings wherein like reference numerals identify like elements, components, subassemblies etc. FIG. 1 depicts a vehicle (PMV) 2 including a power assembly (PSA) 20. In the described embodiment, the PMV 2 is a three-wheeled scooter having a main structural frame 3, a seal 4a, a seat support stanchion 4b (raised relative to the main body), a front wheel 5 disposed in combination with a steering column 6, a pair of aft wheels 7 (only one being shown in the perspective view), a contoured chassis 9, and a pair of Power Supply Units (PSU) 10a, 10b, e.g., batteries. The main structural frame 3 includes a forward frame portion for mounting the steering column 6, an aft frame portion for mounting the aft wheels 7, side supports $3_{SS}$ for structurally interconnecting the forward and aft frame portions, and at least one cross member $3_{CM}$ for structurally interconnecting the side frame supports $3_{SS}$. A drive train assembly (not shown) is disposed aft of the seat 4a and includes a high torque electric motor for driving the aft wheels 6 through a reduction gearbox. The PMV 2 is operated by conventional throttle controls 16 disposed on the steering column 8 for issuing commands to a controller (not shown) through a power distribution system (e.g., wiring harnesses) for providing electric power to the PMV 2.

The PSA 20 comprises elements that effect electrical continuity between one of the PSU 10a, 10b and electrical systems/harnesses of the PMV 2, continuity between one of the PSU 10a, 10b and a charging unit, or continuity between two or more PSUs 10a, 10b. The PSA 20 comprises the elements that are interposed between the frame 3 and at least one of the power supply units 10a, 10b and functions to secure the power supply units 10a, 10b to the main structural frame 3. Additionally, the PSA 20 comprises elements that integrate one of the PSUs 10a, 10b within or to the contoured chassis 9. Further, in the context used herein, the main structural frame 3 is defined to include any structural element rigidly affixed or stationary with respect to the frame 3. Hence, portions of the contoured chassis 9 may be viewed as sub-elements of the main structural frame 3. Further, a PSU is defined to include elements, which are integral with the PSU, or, elements that, essentially, are permanently affixed to a PSU and only removed or disconnected for repair and/or maintenance. Hence, a battery box or container, which houses a battery and contains the necessary electrical connections therebetween, is also part of the PSU 10.

Figure 2:
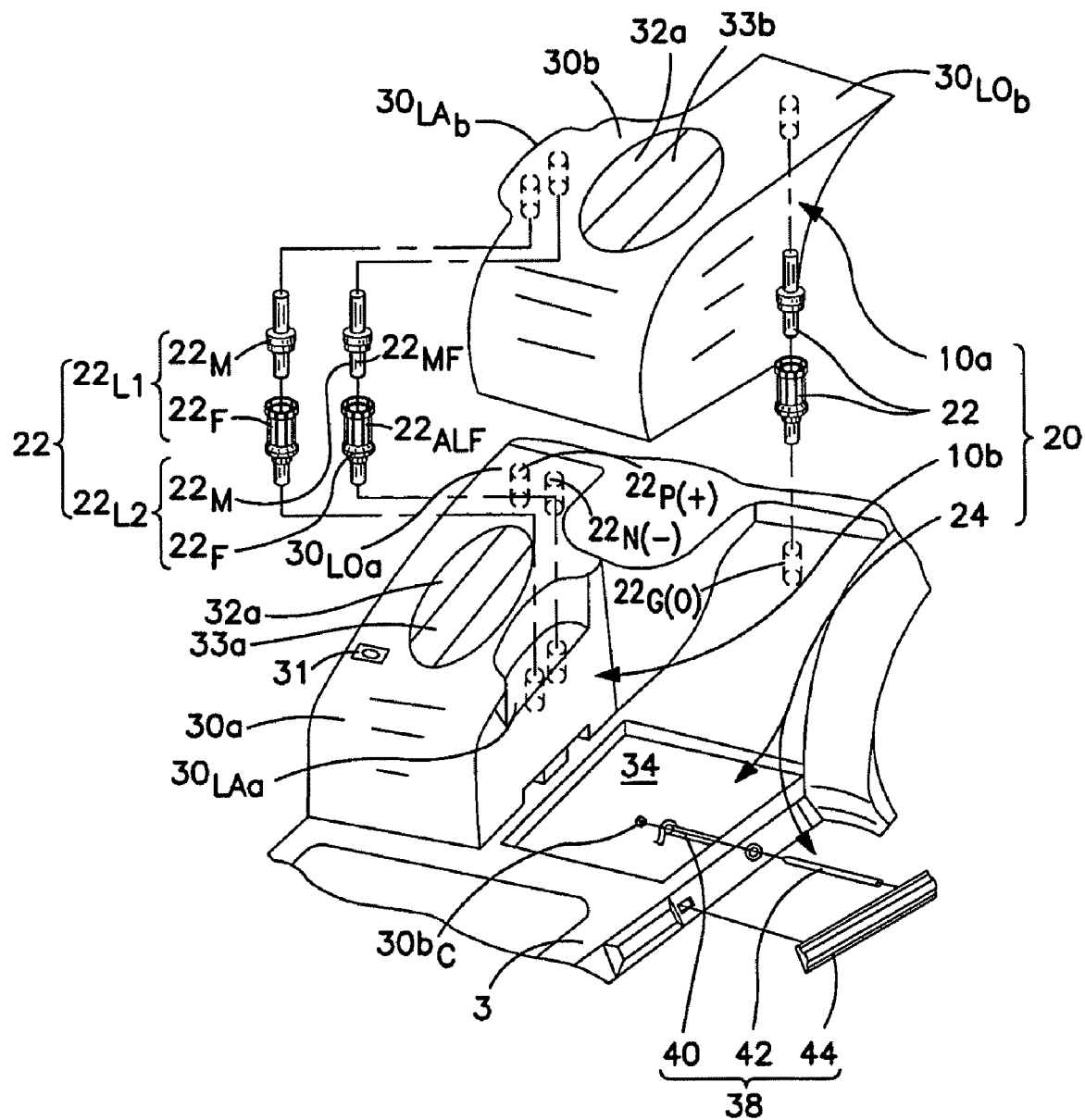
FIG. 2 is an exploded view of the relevant components of the PMV and PSA.

In the preferred embodiment and referring to FIG. 2, the Power Supply Assembly 20 comprises (i) the PSUs 10a, 10b, (ii) electrical connectors 22 for establishing electrical connections between: (i)(a) PSU 10a and PSU 10b, and (i)(b) one of the PSUs 10a, 10b and the PMV 2, and (ii) a retention subassembly 24 for positively engaging the PSUs 10a, 10b relative to the frame 3. Each of the principle elements of the PSA 20, i.e., the electrical connector 22 and retention subassembly 24, will be discussed in greater detail in the subsequent paragraphs.

Figure 3B:
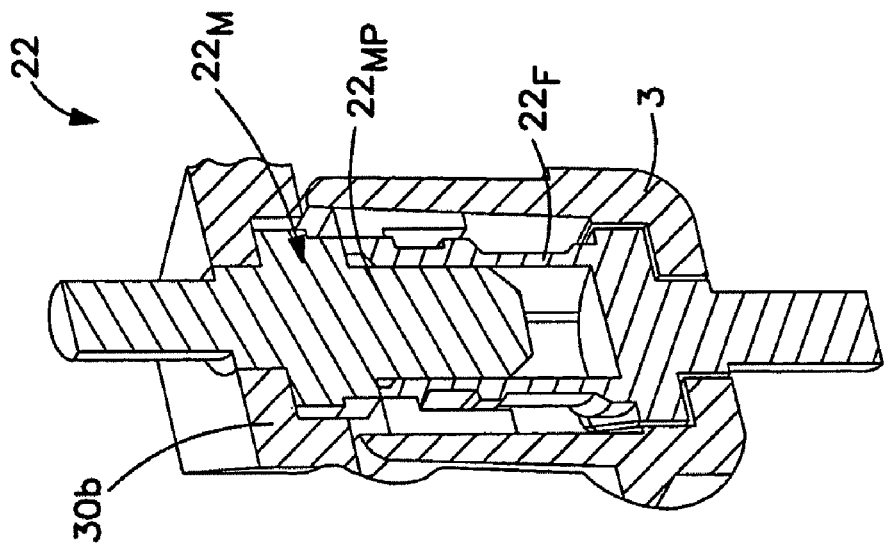
Figure 3A:
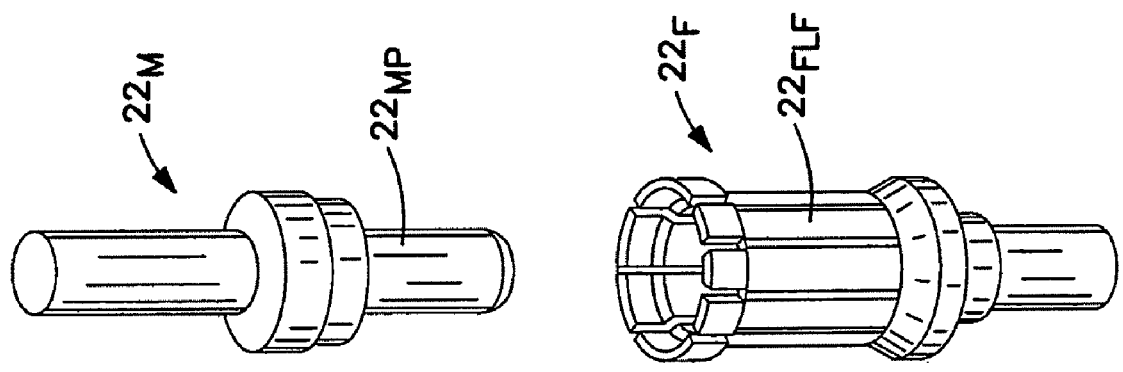
FIG. 3a is an enlarged, isolated view of the male and female contacts of an electrical connector.
Figure 4:
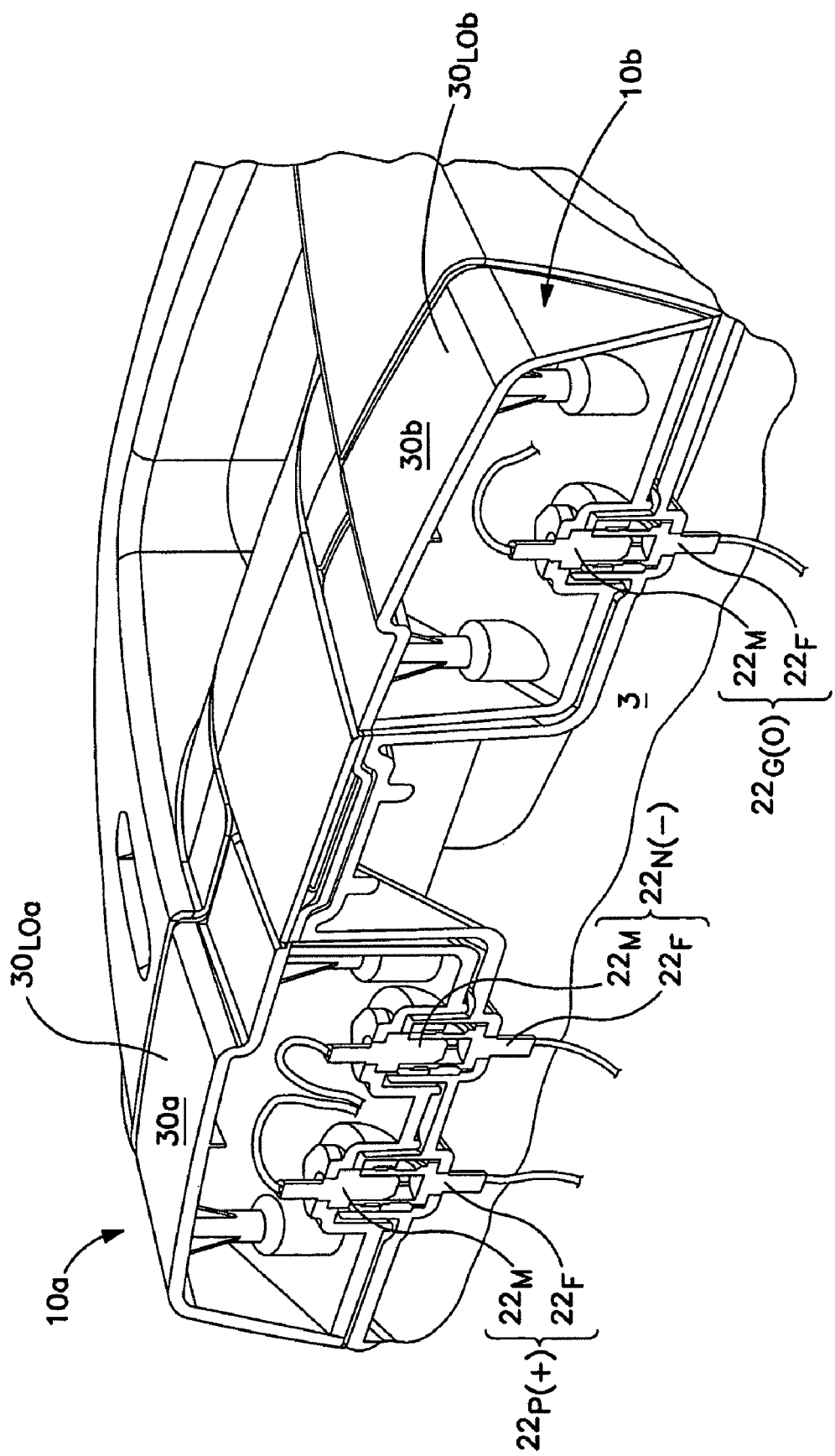
FIG. 4 is a cross sectional view taken substantially along line 4-4 of FIG. 1.

In the exploded and cross sectional views of FIGS. 3a, 3b, and 4, respectively, each of the PSUs 10a, 10b includes a housing structure 30a, 30b, portions of which project from the center body portion, to support and facilitate alignment of the electrical connectors 22. More specifically, each of the PSU 10a, 10b includes laterally projecting/recessing housing segments $30_{LA}$, one such segment $30_{LAa}$ geometrically interlocking with the other segment $30_{LAb}$, to effect an electrical connection between the PSUs 10a, 10b. In the described embodiment, the segments $30_{LAa}$, $30_{LAb}$ are juxtaposed in relation to the segments $30_{LAa}$, $30_{LAb}$, of the opposed housing structure 30a, 30b. Further, the segments $30_{LAa}$, $30_{LAb}$ overlap such that relative vertical displacement of the PSUs 10a, 10b will effect electrical engagement of the contacts $22_{L1}$, $22_{L2}$. That is, the male contacts $22_M$ of the electrical connectors $22_{L1}$, $22_{L2}$ are disposed in combination with the upper overlapping segment $30_{LAa}$ while female contacts $22_F$ are disposed in combination with the lower overlapping segment $30_{LAb}$. In the context used herein, the term "overlapping" means that the segments $30_{LAa}$, $30_{LAb}$ and their respective connectors $22_M$, $22_F$ define a substantially horizontal mating plane.

In FIGS. 2-4, each male contact $22_M$ includes a vertically oriented cylindrical post $22_{MP}$ (best seen in FIG. 3a) and each female contact $22_F$ includes a cylindrical array of longitudinal fingers $22_{FLF}$. As a male contact $22_M$ makes contact with a female contact $22_F$, the cylindrical array of fingers $22_{FLF}$ spread to accept the post $22_{MF}$ (i.e., the long slender shape of fingers effects a series of cantilever springs which spread and capture the post $22_{MF}$).

In addition to the electrical connectors $22_{L1}$, $22_{L2}$ for electrically coupling the juxtaposed PSUs 10a, 20b, three (3) primary electrical connectors $22_{P(+)}$, $22_{N(-)}$, $22_{G(0)}$ are made between the PSUs 10a, 10b and the main structural frame 3. That is, a positive (+), negative (−), and ground (0) connection are made to provide power to the drive train assembly and/or other PMV components requiring electric power. In the described embodiment, the PSU housing structures 30a, 30b include longitudinally projecting segments $30_{LOa}$, $30_{LOb}$ for supporting and mounting the primary electrical connectors $22_{P(+)}$, $22_{N(-)}$, $22_{G(0)}$ for powering the PMV 2. Similar to the lateral segments $30_{LAa}$ $30_{LAb}$, the longitudinal segments $30_{LOa}$, $30_{LOb}$ may also be viewed as overlapping with respect to the underlying main structural frame 3. In the described embodiment, the positive and negative contacts $22_{P(+)}$, $22_{N(-)}$ are mounted in combination with one of the PSUs 10a while the ground contact $22_{G(0)}$ is mounted in combination with the other of the PSUs 10b. While not an element of the mounting/installation assembly 20, at least one of the PSUs 10a may include an electrical port 31 for recharging the PSUs 10a, 10b. For recharging, the PSUs 10a, 10b are electrically coupled, i.e., coupled via lateral contacts $22_{L1}$, $22_{L2}$. This configuration also allows for the PSUs 10a, 10b to be recharged while not attached to the PMV 2. PSUs 10a, 10b can be removed from the PMV 2, recoupled together and recharged simultaneously as a unit via electrical port 31 while not attached to the PMV 2 using an external power source (e.g., battery charger coupled to a household electrical outlet).

It will be apparent that the housing structures 30a, 30b mate to form a geometrically blended external profile. In the context used herein, geometrically blended means that portions of the housing structures are contiguous and are substantially flush (i.e., no abrupt changes in the external geometry, e.g., steps) at the juncture of the housing structures 30a, 30b. For example, the overlapping segments $30_{LAa}$ $30_{LAb}$, form an interlocking ellipse (best seen in FIG. 1) wherein the visible portion of the housing segments, i.e., segment $30_{LAb}$, smoothly blends at the juncture of the housing structures 30a, 30b. Furthermore, the overlapping segments $30_{LOa}$, $30_{LOb}$ geometrically blend with the contoured chassis profile rearward of the PSA 20. Finally, recesses 32a, 32b are provided in the housing structures 30a, 30b to facilitate flush mounting of handles 33a, 33b for mounting or removing the PSUs 10a, 10b into and out of position.

To maintain positive electrical continuity across the male and female contacts $22_M$, $22_F$ of the electrical connectors 22 and to prevent in-plane loads (i.e., longitudinal and lateral) from acting on the connectors 22, the retention subassembly 24 (FIG. 2) secures each of the PSUs 10a, 10b relative to the main structural frame 3. Inasmuch as each retention subassembly 24 is essentially identical (i.e., the mirror image) of the other, only one of the retention subassemblies 24 associated with the right-hand (from an occupant's perspective) PSU 10b will be described.

Figure 5:
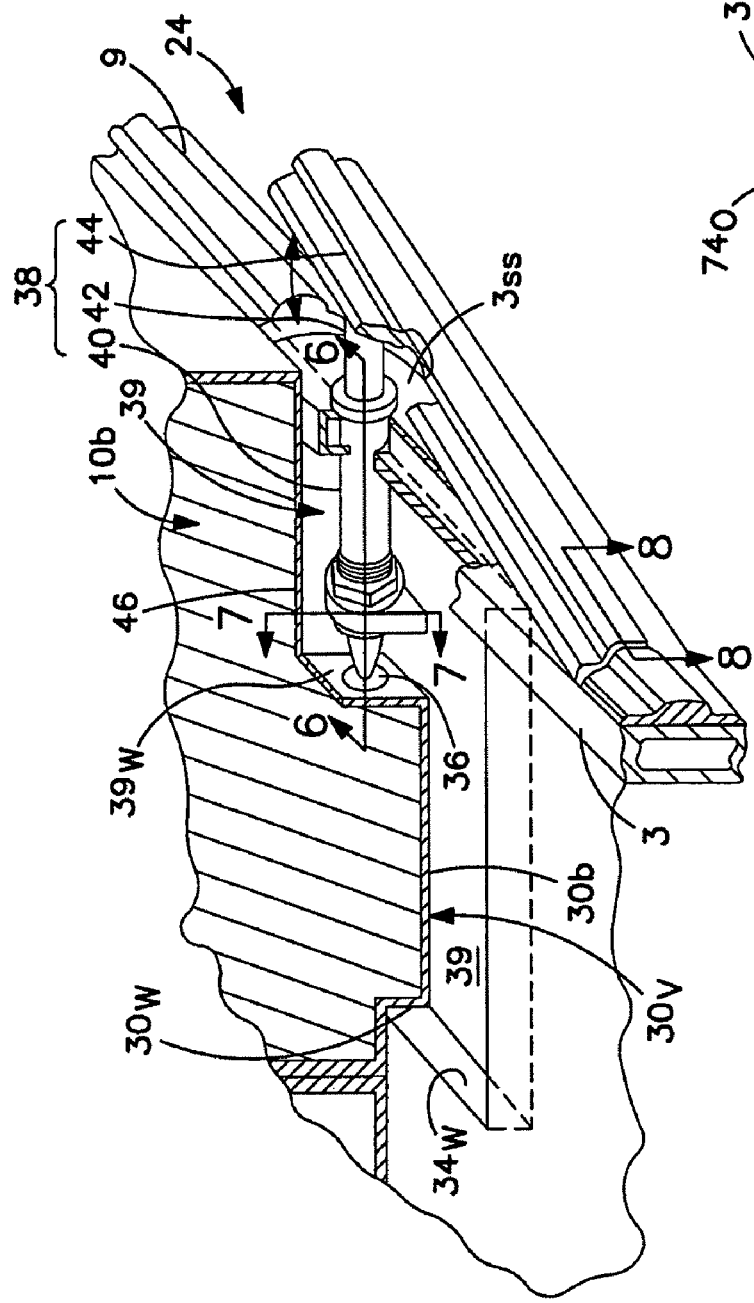
FIG. 5 is a partially broken away cross sectional view of an embodiment of a retention assembly.

In FIGS. 2 and 5, the retention subassembly 24 comprises a base support 34 for accepting the power supply unit 10b, an aperture 36 formed along the underside 30 of the housing 30a, and a latching mechanism 38 for vertically retaining the power supply unit 10b relative to the base support 24. Before discussing the functional interaction of the various components of the retention subassembly 24, a brief description of the structural features of each will be provided to facilitate an understanding of its operation.

The support base 34 is disposed in combination with the main support frame 3 and configured to match the shape/mate with the PSU 10b. More specifically, the support base 34 defines vertical retaining walls $34_W$, which abut mating walls $30_W$ of the PSU housing 30b. The vertical walls $34_W$ are also tapered to align the PSU 10b upon installation.

Along the underside $30_U$ of the housing 30b is a lateral channel 39, which forms a vertical wall $39_W$. The aperture 36 is disposed through the vertical wall $40_W$ and at a location which closely corresponds to the centroid $30b_C$ of the support base 34.

Figure 6:
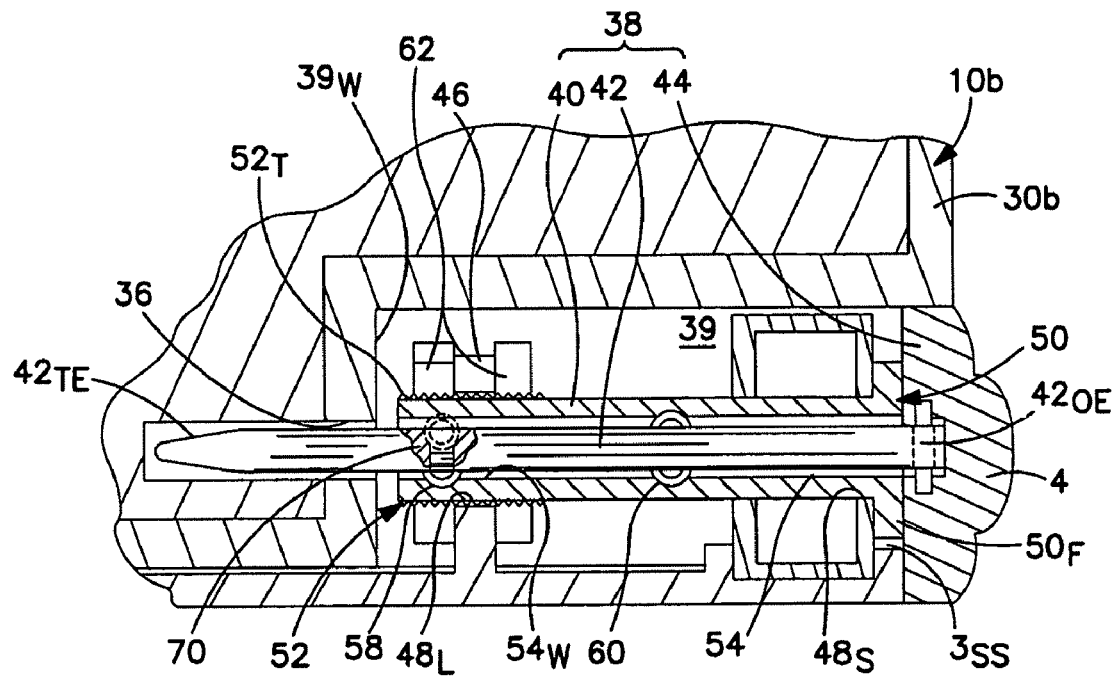
FIG. 6 is a cross sectional view taken substantially along line 6-6 of FIG. 5.
Figure 7:
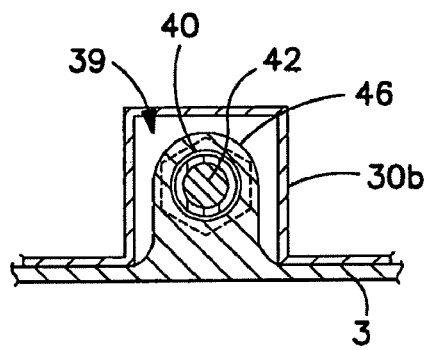
FIG. 7 is a cross sectional view taken substantially along line 7-7 of FIG. 5.
Figure 9:
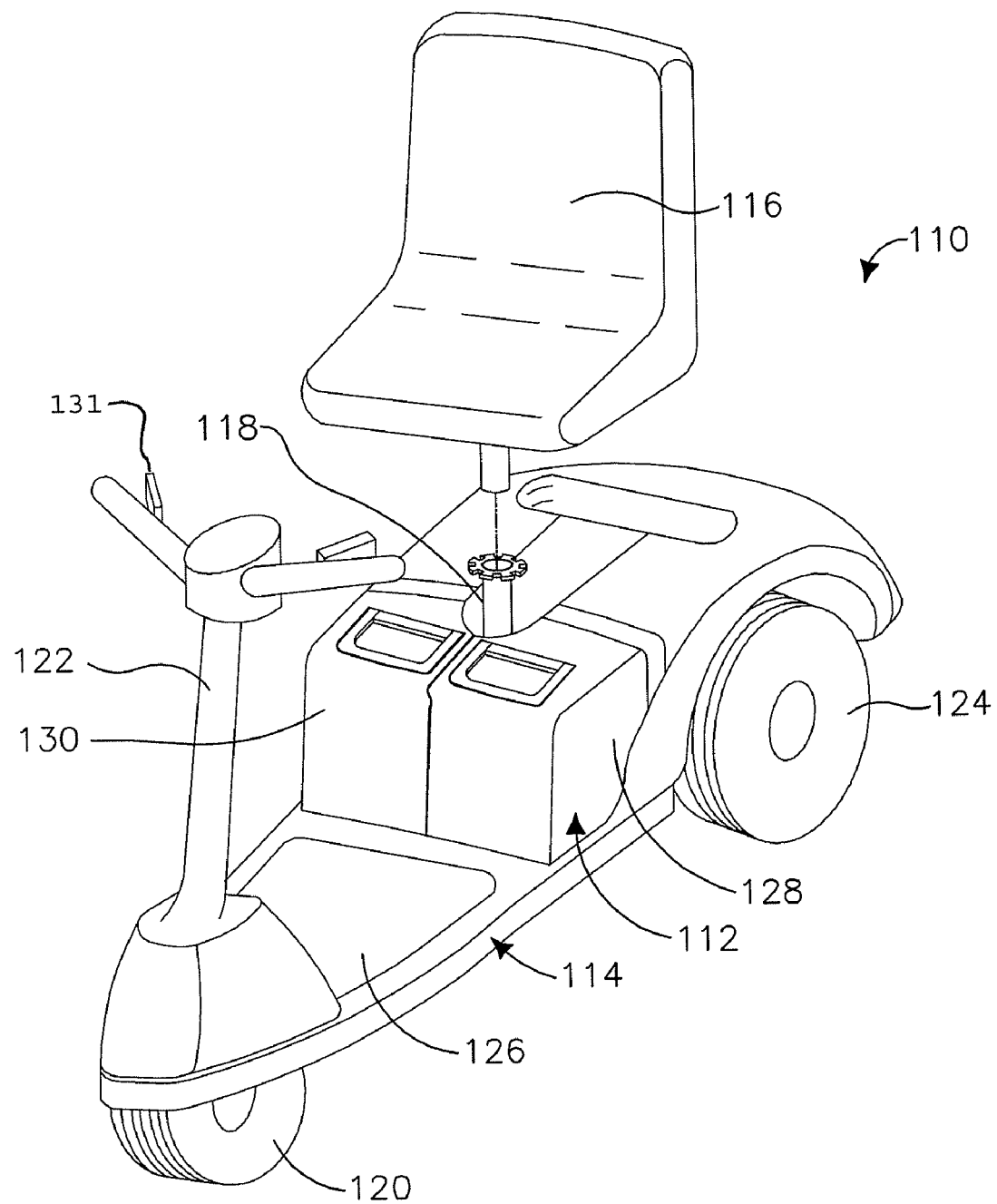
FIG. 9 is a further perspective view of a vehicle and power supply assembly combination.

In FIGS. 5, 6 and 7, the latching mechanism 38 comprises a cylindrical sleeve 40 mounting to the main structural frame 3, a pin 42 disposed through the sleeve 40, and a handle 44 operative to displace the pin 42 within the sleeve 40. More specifically, the main structural frame 3 includes a lug 46 that in combination with the side support $3_{SS}$ define aligned apertures 48L and 48S, respectively. The apertures 48L, 48S accept and support the cylindrical sleeve 40 in a substantially horizontal plane. The cylindrical sleeve 40 has a flanged end 50, a threaded end 52 and a longitudinal bore 54 extending the length of the sleeve 40. Further, the cylindrical sleeve 40 includes first and second internal circular grooves 58, 60 formed along the internal wall $54_W$ of the bore 54. The grooves 58, 60 are spaced-apart and disposed between the flanged and threaded ends 50, 52 of the cylindrical sleeve 40. When assembled in combination with the frame 3, the flange $50_T$ of the sleeve 40 abuts the longitudinal side support $3_{SS}$ and the threads $50_T$ are disposed on each side of the lug 46. As such, nuts and washers 62 are employed to engage the threads $50_T$, and capture the lug 46 therebetween.

The pin 42 is disposed through the cylindrical bore 54 of the sleeve 40 and extends beyond each end 50 or 52 of the sleeve 40. More specifically, the pin 42 has an outboard end 42 on which is pivotally mounted to the engagement handle 44 and a tapered inboard end $42_{TE}$ aligned with the aperture 36 along the underside $30_U$ of the housing 30a. Further, the pin 42 includes a radially-biased ball catch 70 disposed between the inboard and outboard ends $42_{OE}$, $42_{TE}$.

Figure 8:
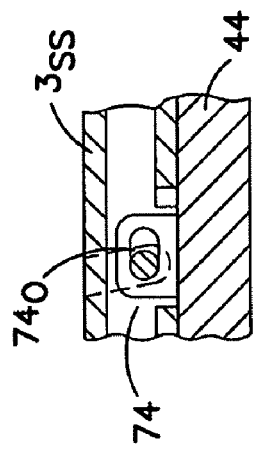
FIG. 8 is a cross sectional view taken substantially along line 8-8 of FIG. 5.

In FIGS. 5, 6 and 8, the engagement handle 44 is pivotally mounted to the longitudinal side support $3_{SS}$ and pivots outboard, away from the PSU 10b, relative to the side support $3_{SS}$. Further, a pivot connection 74 (FIG. 8) between the handle 44 and the side support $3_{SS}$ includes an elongated aperture $74_O$ to allow both rotational and translational motion. This feature will be understood when discussing the operation of the handle 40. Further, the engagement handle 44 is disposed laterally outboard of the PSU 10b, and is externally accessible.

With respect to the operation of the PSA 20, the engagement handle 44 is positioned/rotated outwardly causing the pin 42 to traverse relative to the cylindrical sleeve 40. The pin 42 is recessed within the cylindrical sleeve 40 until the ball catch 70 aligns with and engages a first detent position created by the internal circular groove 58. The first detent position corresponds to a disengaged pin position, which provides clearance for the housing structure 30b as it seats within the base support 34. More specifically, the first detent position ensures adequate clearance between the tapered end $42_{TE}$ of the pin 42 and the vertical wall $40_W$ which defines the aperture 36. The PSU 10b is then vertically lowered into the base support 34. As the PSU 10b is lowered, the tapered walls $34_W$ thereof align the PSU 10b relative to the main structural frame 3 and, simultaneously, align the male and female contacts $22_M$, $22_F$. While some downward force may be required, the weight of the PSU 10b will generally be sufficient to cause the posts $22_P$ of the male contacts $22_M$ to engage and spread the longitudinal fingers $22_{LF}$ of the female contacts $22_F$. As such, the requisite electrical connections are made.

Once fully seated, the aperture 36 of the PSU housing 30a will align with the tapered end $42_{TE}$ of the pin 42. The handle 44 is then rotated to effect linear displacement of the pin 42 to cause engagement thereof with the aperture 36. In view of the pure linear motion of the pin 42 within the cylindrical sleeve (i.e., the sleeve 40 being fixedly mounted to the frame), the pivot connection 74 must necessarily accommodate both rotational and translational motion. That is, the linear component of displacement caused by the arcuate motion of the handle 44 is accommodated by the elongate aperture $74_O$ of the pivot connection 74. When the handle 44 is fully engaged, the ball catch 70 is aligned with and engages a second detent position created by the internal groove 60. Furthermore, the handle 44 is flush with the external profile of the chassis 9.

The PSA 20, as shown, effects all requisite electrical and structural connections by two simple movements. That is, all electrical connections are effected by a single downward (vertical) motion of the PSUs 10a, 10b while all structural connections are made by pivoting a handle 44 to effect pin engagement. With respect to the latter, the PSU 10a, 10b are retained laterally and longitudinally by the abutting walls $34_W$ of the base support 34 and retained vertically by the pin 42. As such, the retaining walls $34_W$ of the support base 34 react in-plane loads, i.e. principally in-plane inertial loads, acting on the PSU 10b, while the pin 42 and aperture 36 react vertical loads. Consequently, the electrical connectors 22 are essentially unloaded.

In addition to the positive electrical/structural connection effected by the PSA 20, the accessibility and ease with which the handle 44 may lock or unlock the PSA 20 facilitates transport of the PMV 20 to alternate destinations. That is, both PSUs 10a, 10b can be removed without dismantling a chassis or frame as is typically required by prior art mounting assemblies.

It will be appreciated that the PSA 20 provides an ability to blend functional and structural components, i.e., the electrical connectors 22, housing 30a, 30b, engagement handle 44, into an aesthetically pleasing package.

Referring now to the embodiment shown in FIGS. 9-14, there is shown a vehicle (PMV) 110 including a power supply assembly (PSA) 112 thereon. In the embodiment shown, the vehicle 110 is a three-wheeled scooter having a vehicle body or frame 114, a seat 116 (shown raised relative to the main body of the vehicle), a seat support 118, a front wheel 120 disposed in combination with a steering column 122, a pair of aft wheels 124 (only one being shown in the perspective view) and a foot platform 126. The power supply assembly 112 includes two portions, each having a battery housing 128, 130. Each assembly is supported on the body of the vehicle 110.

The vehicle 110 includes a forward frame portion for mounting the steering column 122, an aft frame portion for mounting the aft wheels 124 and a central frame portion 114 for supporting the foot platform 126 and the battery housings 128, 130. A drive assembly (not specifically illustrated but may include any known construction) is disposed aft of the seat support 118 and is used to drive one or both of the aft wheels 124 to propel the vehicle 110. The drive assembly is contemplated to include a high torque electric motor and is connected to the aft wheels 124 through a reduction gearbox (also not particularly illustrated) as is common in the vehicle art. Alternate drive assemblies are possible, including a drive means for the front wheel.

The vehicle 110 includes conventional throttle controls 131 disposed on the steering column 122 for issuing commands to a controller or similar mechanism (not particularly illustrated) through a power distribution system (e.g., wiring harnesses) for controlling electric power to the drive assembly (and other vehicle components) and, thus, the operation of the vehicle 110.

The power supply assembly 112 comprises the elements that create electrical continuity between the batteries 132 (see FIGS. 14A and 14B) retained within the housings 128, 130. The power supply assembly 112 may further include a charging unit and its related connections for recharging the batteries 132 retained within housings, 128, 130. The elements of the power supply assembly 112 connect to the power distribution system within the frame 114 to permit the batteries 132 to power operation of the vehicle 110. The battery housings 128, 130 also include battery connectors 136 (see FIGS. 11-13 and also FIGS. 3a and 3b) to form the electrical connections between the two housings 128, 130.

Figure 10:
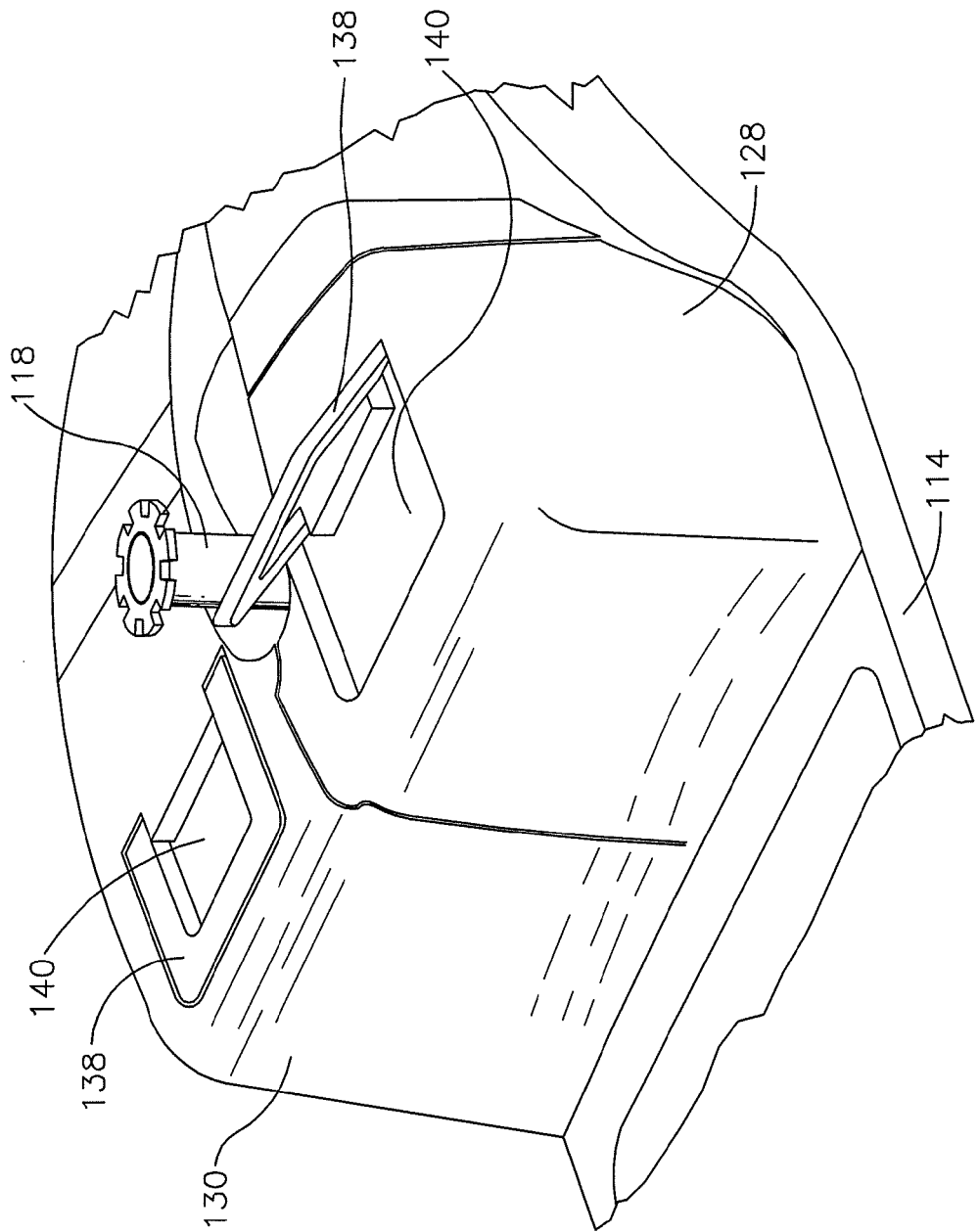
FIG. 10 is a partial view of the relevant components of a vehicle and a power supply assembly of a further embodiment.

In FIG. 10, the two battery housings 128, 130 are positioned side-by-side on the vehicle frame 114. As illustrated, the housings 128, 130 form a unified structure and surround the seat support 118. The housings further blend with the vehicle frame and other elements, such as the fenders that overhang the aft wheels 124 and the drive assembly. The electrical connection of the two battery housings 128, 130 is contemplated to be similar to that shown and described above with respect to FIGS. 1-8.

Figure 11:
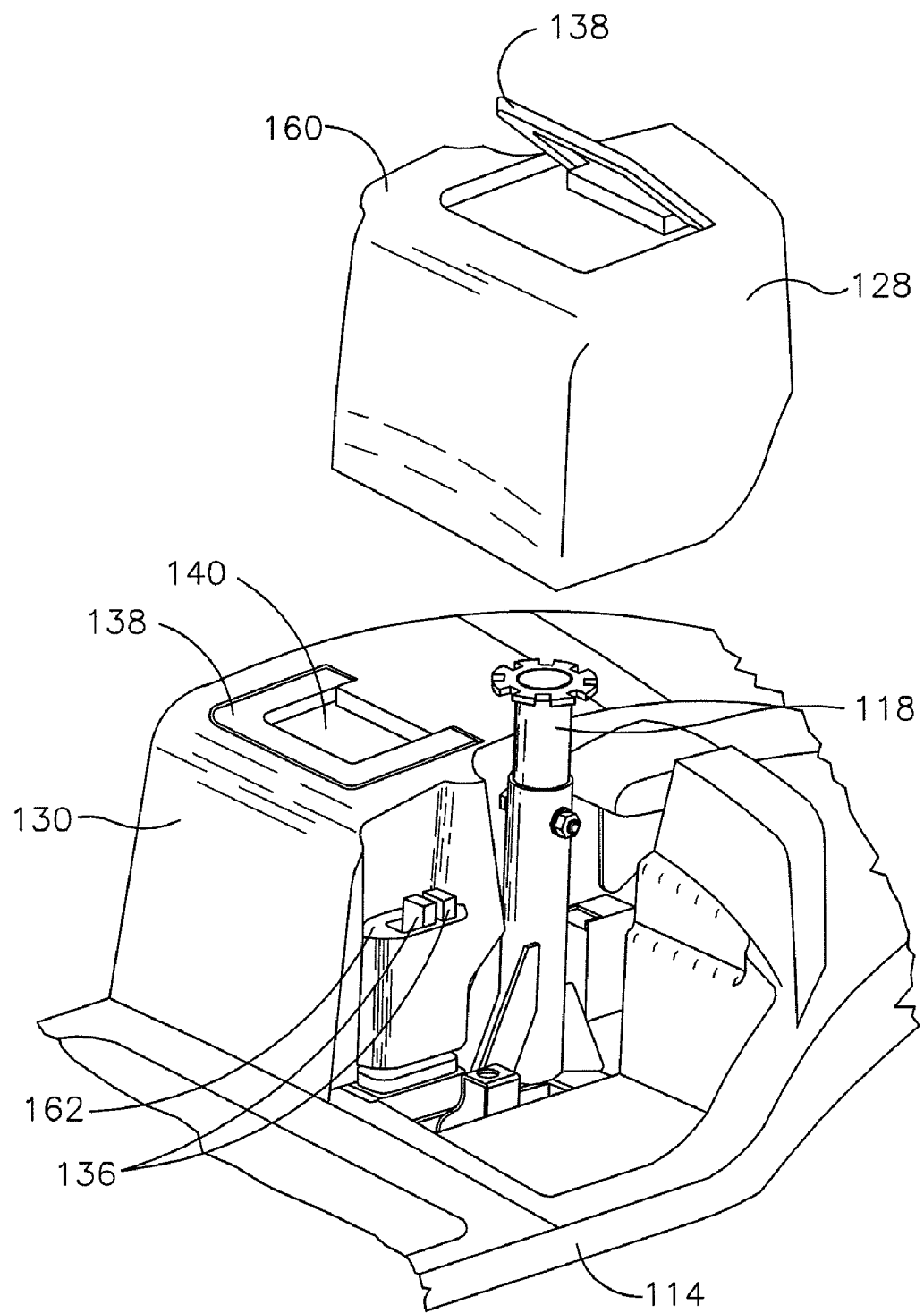
FIG. 11 is an exploded view of the relevant components of the vehicle and power supply assembly of FIG. 10.
Figure 12:
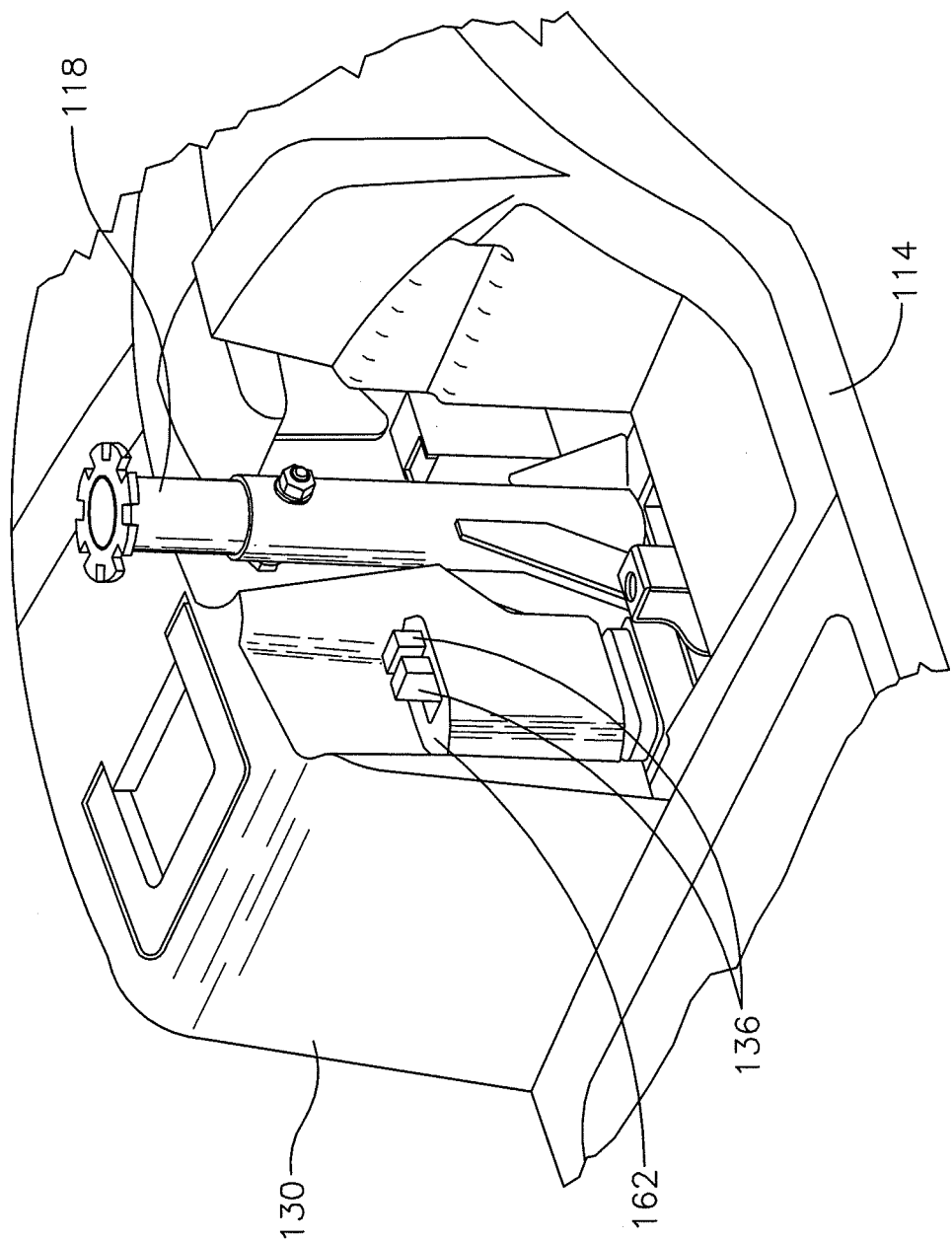
FIG. 12 is a further perspective view of the vehicle and power supply assembly of FIGS. 10 and 11, with one battery housing removed from the combination.

Each battery housing 128, 130 includes a handle 138 that is pivotably attached to the top surface of the respective housing. As shown in FIG. 10, the handle 138 is pivoted upwardly so that the housing 128 (and the battery 132 therein) can be lifted from the vehicle frame 114. The handle 138 shown on housing 130 is pivoted downwardly into a recess 140 on the upper surface of the housing 130. A similar recess 140 is formed on the other housing 128 for receipt of its handle 130. In FIG. 11, one housing 128 has been lifted off the vehicle frame 114, exposing the base portion of the seat support 118 and the connectors 136 formed on the other housing 130. The lifted housing 128 also includes connectors which mate with the connectors 136 on the housing 130 so as to electrically couple the two housings 128, 130. Similar connectors are formed on the rear portions (or as otherwise desired) of the housings 128, 130 so as to connect the power supply assembly 112 to the power distribution system of the vehicle 110. In addition, an outward projection 160 on the first housing 128 integrates with the mating surface 162 on the second housing 130 to vertically retain the second housing 130, when the first housing 128 is positioned on the frame 114 and the connectors 136 from the two housings 128, 130 are coupled together (as in FIG. 10).

Figure 13:
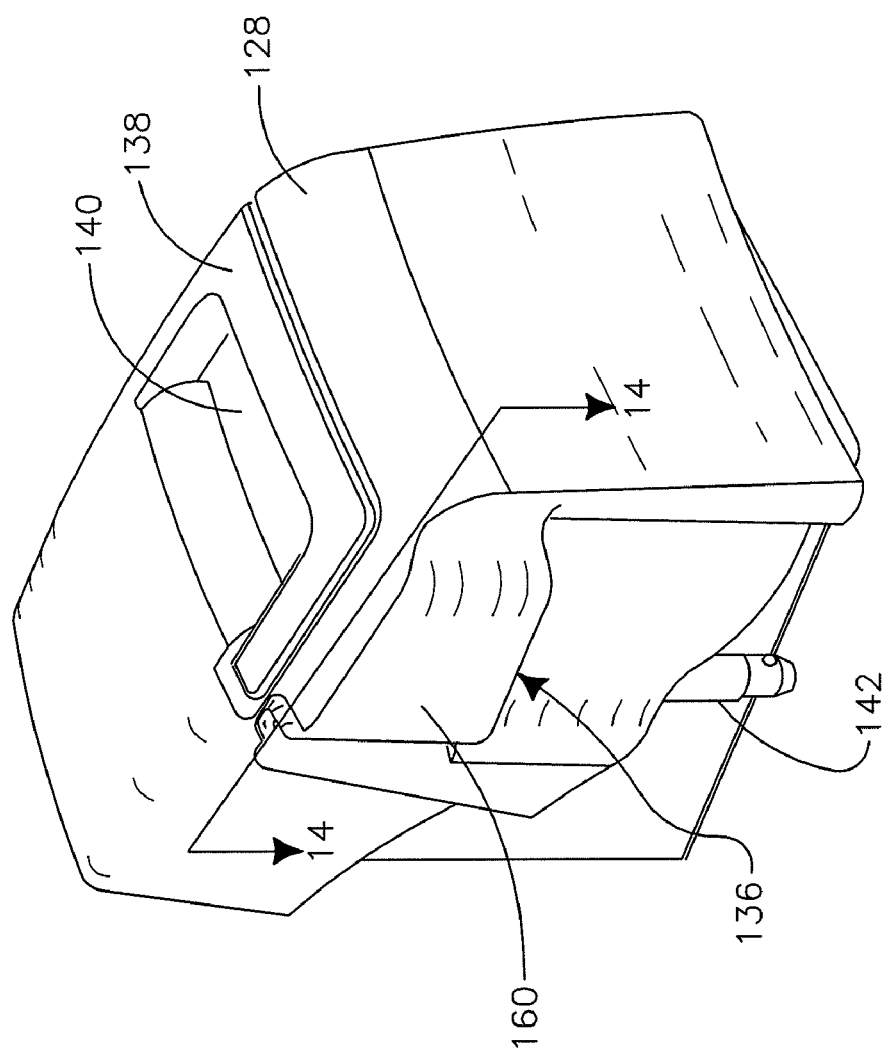
FIG. 13 is a perspective view of a battery housing portion of the power supply assembly of FIGS. 10-12.

In FIG. 13, the housing 128 is shown separate from the vehicle, such as for storage or charging. The housing 128 includes a retention or latch assembly which secures the housing 128 to the vehicle frame 114 when the housing 128 is positioned on the vehicle. The latch assembly includes a pin 142 that projects from the housing 128 and is connected to the handle 138.

In FIGS. 14A and 14B, the operative connection on the handle 138 to the pin 142 is shown. In FIG. 14A, the handle 138 is retained within the recess 140 of the housing 128. Positioned within the housing 128 is the battery 132 (phantom). As shown, the pin 142 is positioned within a bore 144 in the housing. The top end 146 of the pin 142 contacts a cam surface 148 formed as part of the handle 138. The handle pivot 134 is positioned within the recess 140. The cam surface 148 contacts the head 146 of the pin 142 and, in FIG. 14A, with the handle 138 within the recess 140, pushes the pin 142 downwardly such that the projected end 150 of the pin 142 extends from the bore 144 and into an aperture 152 formed in a fitment 154 secured to the vehicle frame 114. A ball catch structure 156 is formed on the projected end 150 of the pin 142 and extends outwardly from the side of the pin 142. The projecting balls are resiliently retained within openings in the surface of the pin 142. In the position shown in FIG. 14A, the ball catch 156 is positioned within the fitment 154, below the surface in which the aperture 152 is formed. Thus, the fitment 154 retains the pin 142 in a locked position, so that the battery housing 128 cannot be easily removed from the vehicle frame 114. Moreover, because the projection 160 overlaps with mating surface 162 on housing 130 (see FIGS. 10 and 11), the housing 128 also retains housing 130 on the frame 114.

In FIG. 14B, the handle 138 is pivoted upwardly, away from the recess 140, such that the cam surface 148 permits the pin 142 to move upwardly within the bore 144, withdrawing the projected end 150 from the aperture 152. The upward movement of the pin 142 is caused by spring 158. The spring 158 provides a restoring force that moves the pin 142 to maintain contact with the cam surface 148 as the handle is pivoted. As the pin 142 moves upwardly, the ball catch 156 moves through the aperture 152. Thus, the ball catch has sufficient resilience to retract the balls and permit the pin 150 to move out of the fitment 154. The housing 128 may then be lifted off the vehicle frame 114.

Although not specifically illustrated herein, a similar retention assembly may be provided on the second housing 130. Thus, the handle 138 on the housing 130 may be pivoted upwardly to release the housing 130 from the vehicle frame 114. As discussed above, the overlapping surfaces 160, 162 (and surfaces $30_{LAa}$ $30_{LAb}$) secure the housings on the frame when the relatively upper surface or projection 160 ($30_{LAb}$) overlaps with the relatively lower surface 162 ($30_{LAa}$) on the second housing. The overlapping surfaces may be formed by a projection on one housing and a corresponding recess on the other housing. Alternately, the two housings may each have projections that extend from the main body of the housing. Additional projection and recess combinations may be utilized, with the separate portions forming a vertical overlap. In addition, the vertical overlap of the housing structures supports the electrical connectors for electrically connecting the batteries when the two housing structures are mated together.

In view of the foregoing, the present invention may be embodied in other specific forms without departing from the spirit or essential attributes thereof and, accordingly, reference should be made to the appended claims, rather than to the foregoing specification, as indicating the scope of the invention.

What is claimed is:

1. A vehicle of the type having at least one front wheel disposed in combination with a steering column, a pair of aft wheels, means for driving at least one of the wheels, a main structural frame having a forward frame portion for mounting the front wheel and the steering column, an aft frame portion for mounting the aft wheels, and a central support for structurally interconnecting the forward and aft frame portions, a seat-support mounted to the frame, and a system for distributing power to the driving means, the vehicle comprising:

a power supply assembly for delivering power to said power distribution system, the power supply assembly including a battery and a housing structure surrounding the battery, the power supply assembly removeably supported on the frame; and a combined lifting and latching assembly comprising
a lifting handle pivotally mounted on the housing, the handle having a first position flush with the housing and a raised lifting position, the handle pivoting outboard from the housing from the first position to the raised lifting position;

an actuator operatively connected to the handle, the actuator movable between a locking position corresponding to the first position of the handle and a release position corresponding to the raised lifting position of the handle, the actuator operatively connected to an elongated pin, the pin slidingly disposed for linear movement within the housing, the pin engaged by the actuator for movement between the locking position, wherein the pin fixedly engages the frame, and the release position, wherein the pin disengages from the frame and permits the power supply assembly to be removed from the frame by a lifting motion operatively supplied to the handle in the raised lifting position, wherein the actuator comprises a cam surface formed as part of the handle and positioned in contact with the pin, the pivoting of the handle moving the cam surface and displacing the pin into and out of engagement with the frame.

2. The vehicle of claim 1, wherein the handle is geometrically blended with the housing structure in the first position.

3. The vehicle according to claim 1, wherein the housing comprises a recess, and the handle positioned within the recess in the first position and projecting from the recess in the raised lifting position.

4. The vehicle according to claim 1, wherein the pin comprises a tapered end that aligns with an aperture formed on the frame when the housing is supported on the frame.

5. The vehicle according to claim 1, wherein the pin in the locking position engages the frame to secure the housing to frame.

6. The vehicle according to claim 5, wherein the pin further comprises a ball catch on a projected end thereof, the pin aligning with and engaging the aperture on the frame and the ball catch engaging the frame to secure the pin to the frame in the locking position.

7. The vehicle according to claim 6, wherein the ball catch is released from engagement of the frame and the pin is withdrawn from the aperture when the actuator is moved to the release position.

8. The vehicle of claim 1 wherein the lifting and latching assembly further comprises a spring operatively connected to the pin for biasing the pin into contact with the actuator.

9. The vehicle of claim 8 wherein the bias of the spring operatively directs the pin towards the release position.

10. A vehicle of the type having at least one front wheel disposed in combination with a steering column, a pair of aft wheels, means for driving at least one of the wheels, a main structural frame having a forward frame portion for mounting the front wheel and the steering column, an aft frame portion for mounting the aft wheels, and a central support for structurally interconnecting the forward and aft frame portions, a seat-support mounted to the frame, and a system for distributing power to the driving means, the vehicle comprising:

a power supply assembly for delivering power to said power distribution system, the power supply assembly including a battery and a housing structure surrounding the battery, the power supply assembly removably supported on the frame; and a combined lifting and latching assembly comprising
a lifting handle pivotally mounted on the housing, the handle having a first position flush with the housing and a raised lifting position, the handle pivoting outboard from the housing from the first position to the raised lifting position;

an actuator operatively connected to the handle, the actuator movable between a locking position corresponding to the first position of the handle and a release position corresponding to the raised lifting position of the handle, the actuator operatively connected to an elongated pin, the pin slidingly disposed for linear movement within the housing, the pin engaged by the actuator for movement between the locking position, wherein the pin fixedly engages the frame, and the release position, wherein the pin disengages from the frame and permits the power supply assembly to be removed from the frame by a lifting motion operatively supplied to the handle in the raised lifting position, wherein the pin in the locking position engages the frame to secure the housing to frame, and wherein the pin is mounted within a bore within the housing, the pin having an outboard end projecting from the housing to engage the frame in the locking position.

11. The-vehicle according to claim 10 wherein the actuator comprises a cam surface formed as part of the handle and positioned in contact with the pin, the pivoting of the handle moving the cam surface and displacing the pin into and out of engagement with the frame.

12. A vehicle of the type having at least one front wheel disposed in combination with a steering column, a pair of aft wheels, means for driving at least one of the wheels, a main structural frame having a forward frame portion for mounting the front wheel and the steering column, an aft frame portion for mounting the aft wheels, and a central support for structurally interconnecting the forward and aft frame portions, a seat-support mounted to the frame, and a system for distributing power to the driving means, the vehicle comprising:

a power supply assembly for delivering power to said power distribution system, the power supply assembly including a battery and a housing structure surrounding the battery, the power supply assembly removably supported on the frame; and a combined lifting and latching assembly comprising a lifting handle pivotally mounted on the housing, the handle having a first position flush with the housing and a raised lifting position, the handle pivoting outboard from the housing from the first position to the raised lifting position;

an actuator operatively connected to the handle, the actuator movable between a locking position corresponding to the first position of the handle and a release position corresponding to the raised lifting position of the handle, the actuator operatively connected to an elongated pin, the pin slidingly disposed for linear movement within the housing, the pin engaged by the actuator for movement between the locking position, wherein the pin fixedly engages the frame, and the release position, wherein the pin disengages from the frame and permits the power supply assembly to be removed from the frame by a lifting motion operatively supplied to the handle in the raised lifting position, wherein the operative engagement of the pin and the actuator comprises a cam surface, wherein the movement of the actuator cam by means of the pivoting movement of the handle into the first position causes the pin to project from the housing into the locking position, and wherein the movement of the actuator cam during movement of the handle to the raised lifting position causes the pin to retract toward the housing into the release position.

13. A vehicle having a plurality of wheels for rolling support of the vehicle, a frame supporting to plurality of wheels, a seat mounted on the frame, means for driving at least one of the wheels for propelling the vehicle, and a system for controlling the distribution of electrical power to drive means, the vehicle comprising a power supply assembly for delivering electrical power to said power distribution system, the power supply assembly comprising a housing encapsulating a battery therein;

a retention assembly for releaseably retaining the power supply assembly on the frame, the retention assembly comprising an aperture formed on the frame, and a latching mechanism for selectively engaging the aperture, the latching mechanism comprising a pin slidingly disposed within a bore formed in the housing, the pin having an outboard end aligned with the aperture on the frame when the housing is supported on the frame, the pin engaging the frame in a first position wherein the outboard end of the pin is inserted into the aperture and wherein the pin is movable to a second position wherein the outboard end is withdrawn from the aperture, a lifting handle pivotally connecting to the housing, the handle operatively connected to the pin, wherein the pivoting of the handle causes movement of the pin between the first and second positions, into and out of engagement with the frame aperture, wherein the pivotal position of the handle corresponding to the first position of the pin causes engagement of the housing to the frame, and a spring biasing the pin into operative connection with the lifting handle and the lifting handle movement into the first position moves the pin opposite the bias of the spring.

14. The vehicle according to claim 13 wherein power supply assembly further comprises an electrical port for connecting the battery to an external power source for recharging.

15. The vehicle according to claim 13, wherein the frame further comprises a base support for accepting and positioning the power supply assembly on the frame.

16. The vehicle according to claim 13, further comprising a ball catch formed on the end of the pin, the ball catch engaging the aperture and retaining the pin therein, and disengaging from the aperture upon pivoting of the handle and displacing the pin away from the frame.

17. A power supply assembly for a vehicle having a frame, the power supply assembly comprising:

first and second housing structures for supporting and retaining first and second battery units, each of the housing structures being mountable on the frame of the vehicle and defining an inner cavity sized to accommodate a power supply unit inserted therein, the first housing structure including a central body portion and a first overlapping portion of the housing structure extending outwardly from the central body portion of the housing structure, and the second housing structure having a second body portion and a second overlapping portion of the housing structure formed within the second body portion of the housing structure, the second overlapping portion formed for vertically receiving and engaging the first overlapping portion, and the first overlapping portion vertically overlapping with the second overlapping portion, wherein the first housing structure vertically retains the second housing structure by means of vertical engagement of the first and second overlapping portions when the first and second housing structures are mated together, and wherein the first housing structure is vertically removable from the second housing structure to release the second housing structure.

18. The power supply assembly of claim 17 further comprising:

electrical connectors formed on the first and second housing structures, the connectors electrically connected to the first and second battery units supported in the respective housings, wherein the electrical connectors are formed in the first and second overlapping portions and the first battery unit is electrically connected to the second battery unit through the electrical connectors when the housing structures are overlapping and vertically engaged.

19. The power supply assembly of claim 18 wherein the second battery unit may be electrically connected to the vehicle through electrical connectors formed on the second housing structure.

20. The power supply assembly of claim 17 wherein the second overlapping portion is defined by a recessed portion within the second housing structure, formed to receive and mate with the extension of the first overlapping portion, with the second overlapping portion engaging the first overlapping portion.

21. The power supply assembly of claim 17, further comprising a latching mechanism formed within at least one of the housing structures for releaseably securing the housing structures to the vehicle.

22. The power supply assembly of claim 21 wherein the latching mechanism comprises a moveable pin slideably retained within the at least one of the housing structures, the pin moveable between a locking position wherein the pin secures the housing structures to the frame and a release position wherein the pin moves away from the locking position.

23. The power supply assembly of claim 22 wherein the moveable pin is mounted within a bore with the at least one housing structure, the pin having an outboard end projecting from the housing to engage a vehicle frame in the locking position.

24. The power supply assembly of claim 22 wherein the latching mechanism further comprises a pivotably mounted lifting handle, the handle operatively connected to the pin for causing movement of the pin between the locking position and the release position as a result of the pivoting movement of the handle from a storage position to a lifting position.

25. The power supply assembly of claim 24 wherein the operative connection of the pin and the handle comprises an actuator cam, wherein movement of the actuator cam by the pivoting of the handle into the storage position causes the pin to project from the housing into the locking position, and wherein the movement of the actuator cam during movement of the handle to the lifting position causes the pin to retract toward the housing into the release position.

26. The power supply assembly of claim 24 wherein the handle is pivotably attached to the first housing structure and the pin is slidingly retained within the first housing structure.

27. The power supply assembly of claim 26 wherein the handle is retained within a recess within the first housing structure in a storage position, corresponding to the locking position of the pin and is pivoted away from the housing structure to the lifting position corresponding to the release position of the pin.

* * * * *